Patented Oct. 17, 1944

2,360,769

UNITED STATES PATENT OFFICE 2,360,769

PROCESS FOR BIOLOGICAL TREATMENT OF SEWAGE, TRADE WASTES, AND THE LIKE

Weston Gavett, Plainfield, N. J.

No Drawing. Application October 22, 1941, Serial No. 416,072

13 Claims. (Cl. 210—2)

My invention relates generally to the purification of liquids and more particularly to a filtering process for biological treatment of sewage and/or trade wastes, the same being a continuation in part of the clarifying process disclosed in my pending application, serially numbered 257,951 and filed February 23, 1939, which has since matured into Patent No. 2,287,983, granted June 30, 1942.

In the clarifying process referred to, only the suspended solids are removed from the liquid treated, the operation being as follows: granular filter media is fed forward, in opposition to a continuous flow of the liquid to be filtered and the exposed portion of the media with the solids deposited thereon by a liquid is continuously or intermittently removed, cleaned and returned, while the filter is in operation.

I have found this clarifying process effective for simultaneous biological treatment of the sewage, by subjecting the media, after removal and before it is returned to the filter, to an aerobic environment, the effect of which is to restore the media, biologically, for continued use.

In the use of present methods of sewage treatment, the best results are obtained with intermittent sand filters, in which the sewage is applied intermittently to a filter of sand of approximately 0.4 mm. effective size. While the results obtained are fairly satisfactory, an extensive plant area is required and the costs of installation and operation run into objectionably large figures. Trickling filters using stone of 1½ inches or larger sizes, operate at higher rates but produce a poorer effluent. With such filters it is necessary to use large size media to prevent clogging of the unit or else use very low rates of application, as with intermittent sand filters.

My improved process requires a comparatively small plant area and enables high rates to be used with a fine media, as the media is continuously removed or is removed at such frequent intervals as may be found necessary to clear it of collected solids and maintain aerobic conditions and it is then returned with the biological film thereon intact and effective for continued use.

In aerobic biological filtration or purification, clarification is effected quite rapidly, as the organic matter is adsorbed by the film on the media or, in the case of activated sludge, by the floc but a time element is required for the assimilation of the adsorbed organic matter by the flora in the film or in the floc. In a continually dosed unit such as a trickling filter or activated sludge, the applied organic load must be a function of the quantity of film or floc, so that the required time for assimilation of the organic matter is provided.

In my improved process, the organic matter will be adsorbed by the film on the media as the sewage passes through the filter and on the removal of this media, it may be passed through either aerating racks or bins or through aerating tanks, to provide the necessary time for the film or floc to accomplish the assimilation and purification stage.

In the use of the process and filter apparatus of my prior application for biological treatment of sewage, the process is carried out without interfering with or interrupting the operation of the filter and is, as follows: the liquid to be treated is passed in a substantially horizontal direction through a body of granular filter media, preferably, though not necessarily, arranged to provide entrance for the liquid at different levels leading to a common outlet of multiple openings reduced to prevent escape of the filter media, the liquid entering at the different levels through surfaces of the media sloped to the angle of repose thereof. These sloping surfaces are maintained free and clear of deposited solids by a traveling scraper by which the exposed surface layer of the media is removed to a suitable depth, with the solids deposited thereon. This removed material is conducted, preferably separated from the surrounding unfiltered liquid, outside of the filter to a cleaning unit which removes the excess organic matter only, leaving the film covering the media undisturbed. The media is then subjected to an aerobic environment by being deposited in open racks or bins suitable for providing temporary storage space and which permit free access of air to the media, or, if desired, air under pressure may be supplied by the use of blowers, air diffusers or the like, to hasten the action. As the media passes through the aeration stage and is thereby made effective biologically for continued use, it is returned to the filter for distribution to the different levels and advancement, preferably by its own weight, toward the inlets, to simultaneously replace like removals and maintain the media in circulation and the quantity of media employed in the filter against depletion.

The process may be practiced with filters of other forms in which there is circulation of the media or it can be made otherwise available for the above described treatment, without interrupting the filtering operation.

For certain types of wastes, anaerobic treatment of the sewage is found desirable and beneficial, that is, bacterial action in the absence of oxygen, requiring the presence of moisture and moderate temperatures. For this treatment, either the above described filter unit or a duplicate may be employed to carry out the process which differs from that described only in clearing the removed media of excess organic solids under anaerobic conditions, instead of in an aerobic environment.

In some cases, a combination of treatments is found advantageous, such as anaerobic and/or aerobic, followed by non-biological clarifaction and in such cases, a separate filter unit would be employed for each treatment, with provision for successively passing the liquid through the several filter units.

Among the important advantages of the invention may be mentioned the following: A higher degree of purification is obtained at a lower cost than is possible with existing systems. Extensive sand filters, tank systems, etc., are not needed in carrying out the process, which greatly reduces the plant equipment and area required. Combining anaerobic and aerobic units enables trade wastes to be effectively treated at comparatively low cost.

Having described my invention, I claim:

1. A continuous filtering process for the biological purification of liquids, consisting of the following steps adapted to be carried out without interrupting the filtering operation: first, passing the liquid through a body of filter media, the particles of which are coated with a film in active aerobic condition; second, maintaining the inlet to the media clear of organic solids by removing the exposed surface layer of the media to a suitable depth as the solids are deposited thereon by the liquid entering the same; third, separating excess organic solids from the removed media and subjecting the media freed of such solids, to an aerobic environment to restore the film-covered particles biologically for continued use, and, fourth; returning the aerobically restored media to the filter and advancing it towards the inlet thereof to replace like removals and maintain the media in circulation.

2. The filtering process, as defined in claim 1, in which the filter media is in the form of finely divided granular material.

3. The filtering process, as defined in claim 1, in which a downwardly sloping surface of the filter media is maintained for the entrance of the liquid therein.

4. The filtering process, as defined in claim 1, in which the inlet to the media is maintained clear of organic solids by periodically removing the surface layer of the media, as required to prevent an accumulation of solids thereon.

5. The filtering process, as defined in claim 1, in which the removed media is freed of excess organic solids without destroying the film on the media.

6. The filtering process, as defined in claim 1, in which the aerobically restored media returned to the filter is advanced towards the inlet thereof in opposition to the flow of liquid through the filter.

7. The filtering process, as defined in claim 1, in which the body of the media is maintained constant and against depletion by returning the media removed in clearing the inlet of organic solids.

8. The filtering process, as defined in claim 1, in which the removed media, after being freed of excess organic solids, is subjected to aeration treatment to restore the film-covered particles biologically for continued use.

9. The filtering process, as defined in claim 1, in which the removed media, after being freed of excess organic solids, is aerated by air under pressure to restore the film-covered particles biologically for continued use.

10. The process of biologically treating liquids which consists of the following steps: passing the liquid through a filter, removing the exposed inlet surface of the filter media to a suitable depth while the filter is in operation to maintain the body of the media clear of excess organic matter deposited by the liquid entering the same, separating the excess organic matter from the removed media in an anaerobic environment, returning the separated media in an active anaerobic biological condition to the filter and feeding it toward the inlet thereof for continued use to replace like removals and maintain the media in circulation without interrupting the operation of the filter.

11. The process, as defined in claim 10, in which the filtered liquid is passed through a second filter and the inlet surface layer of the filter media thereof is removed to a suitable depth while the filter is in operation to maintain the body of the media clear of excess solids deposited by the liquid entering the same, the removed media being then subjected to an aerobic environment to restore it biologically for continued use and returned to the outlet of the second filter and fed forward to replace like removals from the inlet thereof without interrupting the operation of said second filter.

12. The process of biologically treating and purifying liquids which consists of the following steps: successively passing a liquid through a plurality of separate filter units, removing the inlet surface layer of the filter media of each filter unit while the filters are in operation to clear the media of solids deposited thereon by the liquid entering the same, separating the excess organic matter from the media removed from the first filter unit in an anaerobic environment, separating the excess organic matter from the media removed from the second filter unit in an aerobic environment and returning the separated media to the outlet of each filter from which it was removed to replace like removals and maintain the media thereof in circulation without interrupting the operation of the filters.

13. The process of biologically treating and purifying liquids which consists of the following steps: successively passing a liquid through a plurality of separate filter units, removing the inlet surface layer of the filter media of each filter unit while the filters are in operation to clear the media of solids deposited thereon by the liquid entering the same, separating the excess organic matter from the media removed from the first filter unit in an anaerobic environment, separating the excess organic matter from the media removed from the second filter unit in an aerobic environment, separating all foreign matter from the media removed from the third filter unit under normal atmospheric conditions, and returning the separated media to the outlet of each filter unit from which it was removed and advancing it to the inlet to replace like removals and maintain the media thereof in circulation and against depletion without interrupting the operation of the filters.

WESTON GAVETT.